United States Patent
Wolf et al.

(10) Patent No.: US 11,001,664 B2
(45) Date of Patent: May 11, 2021

(54) POLYMERIZATION-INDUCED PHASE-SEPARATING COMPOSITIONS FOR ACRYLATE-BASED NETWORKS

(71) Applicant: ARKEMA FRANCE, Colombes (FR)

(72) Inventors: William C. Wolf, Philadelphia, PA (US); David Shin-Ren Liu, Bala Cynwyd, PA (US); Marie Elizabeth Sullivan Malervy, Downingtown, PA (US)

(73) Assignee: Arkema France

( * ) Notice: Subject to any disclaimer, the term of this patent is extended or adjusted under 35 U.S.C. 154(b) by 17 days.

(21) Appl. No.: 16/325,770

(22) PCT Filed: Jul. 6, 2017

(86) PCT No.: PCT/EP2017/066965
§ 371 (c)(1),
(2) Date: Feb. 15, 2019

(87) PCT Pub. No.: WO2018/033296
PCT Pub. Date: Feb. 22, 2018

(65) Prior Publication Data
US 2019/0202961 A1    Jul. 4, 2019

Related U.S. Application Data

(60) Provisional application No. 62/375,487, filed on Aug. 16, 2016.

(51) Int. Cl.
| | |
|---|---|
| *C08F 2/46* | (2006.01) |
| *C08F 2/50* | (2006.01) |
| *C08G 61/04* | (2006.01) |
| *C08F 299/02* | (2006.01) |
| *B33Y 70/00* | (2020.01) |
| *C08F 285/00* | (2006.01) |
| *C08F 290/06* | (2006.01) |
| *B29C 64/264* | (2017.01) |
| *B29C 64/112* | (2017.01) |
| *C08F 2/48* | (2006.01) |
| *C08F 220/18* | (2006.01) |
| *C08F 220/54* | (2006.01) |
| *C08K 5/06* | (2006.01) |
| *C08K 5/07* | (2006.01) |
| *C08K 5/09* | (2006.01) |
| *C08K 5/5397* | (2006.01) |
| *C08L 51/00* | (2006.01) |
| *B33Y 10/00* | (2015.01) |
| *C08L 67/00* | (2006.01) |
| *C08L 71/00* | (2006.01) |
| *C08L 75/04* | (2006.01) |

(52) U.S. Cl.
CPC ........ *C08F 299/024* (2013.01); *B29C 64/112* (2017.08); *B29C 64/264* (2017.08); *B33Y 70/00* (2014.12); *C08F 2/48* (2013.01); *C08F 220/18* (2013.01); *C08F 220/54* (2013.01); *C08F 285/00* (2013.01); *C08F 290/067* (2013.01); *C08K 5/06* (2013.01); *C08K 5/07* (2013.01); *C08K 5/09* (2013.01); *C08K 5/5397* (2013.01); *C08L 51/006* (2013.01); *B33Y 10/00* (2014.12); *C08F 220/1804* (2020.02); *C08L 67/00* (2013.01); *C08L 71/00* (2013.01); *C08L 75/04* (2013.01)

(58) Field of Classification Search
CPC ...... C08F 299/04; C08F 299/024; C08F 2/48; C08F 220/18; C08F 220/54; C08F 220/10; C08F 290/067; C08F 285/00; C08K 5/06; C08K 5/09; C08K 5/07; C08K 5/5397; C08L 51/006; C08L 71/00; C08L 67/00; C08L 75/04; B29C 64/264; B29C 64/112; B33Y 10/00
USPC ................. 522/33, 6, 71, 189, 184, 1; 520/1
See application file for complete search history.

(56) References Cited

U.S. PATENT DOCUMENTS

| | | | |
|---|---|---|---|
| 8,362,148 B2 | 1/2013 | Messe et al. | |
| 2004/0242721 A1* | 12/2004 | Muyldermans | ....... C08L 53/025 522/109 |
| 2008/0090930 A1* | 4/2008 | Madhusoodhanan | .. C09D 11/30 522/83 |
| 2014/0102935 A1 | 4/2014 | Jayasuriya | |
| 2017/0253681 A1 | 9/2017 | Shen et al. | |

FOREIGN PATENT DOCUMENTS

| | | |
|---|---|---|
| CN | 104788625 A | 7/2015 |
| WO | WO 01/68769 A1 | 9/2001 |
| WO | WO 2006/077153 A2 | 7/2006 |
| WO | WO 2007/124911 A1 | 11/2007 |

* cited by examiner

*Primary Examiner* — Jessica Whiteley
(74) *Attorney, Agent, or Firm* — Christopher Lewis

(57) ABSTRACT

Embodiments described herein are directed to polymerization-induced phase-separating (PIPS) compositions for enhancement of impact resistance and rheological properties in photocurable resins for 3D printing, such as for inks, coatings and adhesives. Embodiments described herein are advantageous with respect to properties such as impact resistance, shear adhesion and cohesive strength. The PIPS compositions may include components X, Y and Z, wherein X includes an acrylic based monomer; Y includes a copolymer of block A and block B; and Z includes a multifunctional cross-linker. Methods of using the PIPS compositions are also described. Also described are methods of screening potential acrylic based monomeric or oligomeric additives that yield improved impact resistance.

27 Claims, 6 Drawing Sheets

POLYMERIZATION-INDUCED PHASE-SEPARATING COMPOSITIONS FOR ACRYLATE-BASED NETWORKS

CROSS-REFERENCE TO RELATED APPLICATIONS

This application is a U.S. national stage application under 35 U.S.C. § 371 of PCT/EP2017/066965, filed Jul. 6, 2017, which claims the benefit of U.S. patent application No. 62/375,487, filed Aug. 16, 2016.

FIELD OF THE INVENTION

Embodiments described herein are directed to polymerization-induced phase-separating (PIPS) compositions for enhancement of impact resistance and rheological properties in 3D printing for resins, inks, coatings and adhesives. Embodiments described herein are advantageous with respect to properties such as impact resistance, shear adhesion and cohesive strength.

BACKGROUND OF THE INVENTION

Standard UV curable resins contain a wide variety of monomers and prepolymers of various molecular weights. Development of impact resistant thermosets typically involves use or incorporation of unreactive fillers and rubber particles into resins. However, these methods suffer from drawbacks such as rheological instability, brittleness and ultimately do not provide adequate improvements to the impact resistance of finished articles.

To improve the durability of thermosetting resins, it has been attempted to employ other types of additives to impart properties such as toughness and impact resistance to such resins. For example, toughening strategies suitable for epoxy based systems are well-established. One such strategy is to use polymerization-induced phase-separation (PIPS) mechanism to develop cushioning domains into epoxy-based networks. However, such a strategy has been found to be generally ineffective when applied to photopolymerized acrylate-based networks.

Introduction of appropriate additives to a resin being used for 3D printing may introduce discrete phases or domains that alleviate stresses and improve long term durability and may significantly enhance 3D printing technology and promote their use to produce finished goods over traditional thermoplastics. The use of appropriate additives to impart toughening while maintaining a Newtonian flow profile is desirable.

Thus, there is a need for appropriate additives that realize such advantages. There is also a need for screening potential appropriate additives rapidly.

SUMMARY OF THE INVENTION

Embodiments herein are directed to acrylic block copolymer (ABC) additives that overcome at least some of the drawbacks associated with known additives. Embodiments herein are directed to screening potential additive candidates. Embodiments herein are also directed to resin systems comprising at least the ABC additive, the resin and a methacrylate based cross-linker, which may be referred to as a polymerization-induced phase-separating (PIPS) composition. In embodiments, the PIPS composition may be homogeneous before a curing event. In embodiments, the PIPS composition may be used as a novel ingredient in a three-dimensional (3D) printing resin formulation, ink, coating or adhesive.

In embodiments, the curable composition comprises components X, Y and Z, wherein X comprises an acrylic based monomer; Y comprises a block copolymer of at least one block A and at least one block B; and Z comprises a multifunctional cross-linker. In embodiments, the curable composition is a homogeneous liquid at ambient temperature prior to curing and is nano-structured after curing.

In embodiments, the curable composition comprises about 50-90% by weight of the X component, about 1-30% by weight of the Y component and about 5-60% by weight of the Z component. In embodiments, components X, Y and Z equal 100% by weight of the curable composition. In embodiments, the X component has a molecular weight less than the Y and Z components. In embodiments, the Z component is less reactive than the X component.

In embodiments, components X and Z are different compounds. In embodiments, components X, Y and Z may comprise a single compound or may comprise more than one compound. In embodiments, the difference in block affinity from X to A and from X to B is >0.5 $(cal/cm^3)^{1/2}$ which is equivalent to >1.0 $(J/cm^3)^{1/2}$ or is >0.7 $(cal/cm^3)^{1/2}$ or >1.4 $(J/cm^3)^{1/2}$ or is >1 $(cal/cm^3)^{1/2}$ or >2.0 $(J/cm^3)^{1/2}$ $(cal/cm^3)^{1/2}$ or >1.4 $(J/cm^3)^{1/2}$, wherein the block affinity is defined by the equation:

$$\text{block affinity} = [\Delta d_{dispersive}^2 + \Delta d_{polar}^2 + \Delta d_{hydrogen}^2]^{1/2}.$$

The difference in block affinity may be expressed in units of $(calories/cm^3)^{1/2}$ or in $(J/cm^3)^{1/2}$.

In embodiments, the Z component may be selected from the group consisting of oligomers or monomers with acrylate, vinyl, allylic, epoxy, oxetane, hydroxyl or ring opening functionality. In embodiments, the Z component comprises a polyester-, polyether- or urethane-based backbone. In embodiments, the oligomers of the Z component may have a molecular weight in a range of 1,000-50,000 daltons. In embodiments, the Z component may have a molecular weight in a range of 100-2,500 daltons.

In embodiments, the at least one A block and at least one B block of the Y component are different and may be selected from the group consisting of functionalized or unfunctionalized polymethyl methacrylate (PMMA), polybutyl acrylate (PBA), polydimethylacrylamide (PDMA) or may be selected from the group consisting of functionalized or unfunctionalized polymers of ethylhexyl acrylates, silicon acrylates, alkyl acrylates (meaning alkyl acrylates other than ethyl hexyl acrylates) PEG-based mono-acrylates, acrylic acrylates, isobornyl acrylates, cyclohexyl acrylates, nonyl-vinyl pyrrolidones, cyclic triformyl acrylates, acrylamides, ethoxy(ethoxy ethyl) acrylates and hydroxyethyl acrylates/methacrylates. In embodiments, the at least one A block of component Y may be selected from the group consisting of functionalized or unfunctionalized polyacrylates and polymethacrylates with molecular weight Mw in the range of 1,000-50,000 daltons or more preferably 8,000-35,000 daltons. In embodiments, the at least one B block of component Y may be selected from the group consisting of functionalized or unfunctionalized polyacrylates with molecular weight Mw in the range of 2,500-60,000 daltons or more preferably 5,000-52,000 daltons.

In embodiments, component Y may be a diblock copolymer (e.g., AB) or a triblock copolymer (e.g, ABA) or a higher order block copolymer (e.g., ABAB or ABABA). In embodiments, the blocks of the Y component may be repeated as deemed suitable (e.g., ABABABAB ... without limitation. In embodiments, the blocks of the Y component may be ordered as deemed suitable (e.g., AABA, ABBA, AAB, BAA) without limitation. In embodiments, the at least one A block and at least one B block of the Y component are incompatible (e.g., immiscible) with respect to each other.

In embodiments, component X comprises monofunctional acrylic based monomers (acrylic based means bearing acrylates or methacrylates functionality). In embodiments, component X may be selected from the group consisting of ethylhexyl acrylates, silicon-containing acrylates, alkyl acrylates, PEG-based mono-acrylates, isobornyl acrylates, cyclohexyl acrylates, nonyl-vinyl pyrrolidones, cyclic triformyl acrylates, acrylamides, ethoxy(ethoxy ethyl) acrylates, hydroxyethyl acrylates/methacrylates, tricyclodecane (TCD) monoacrylates, tetrahydrofurfuryl (THF) acrylates, adamantyl acrylates, acryloyl morpholines (ACMOs) and ethoxylated equivalents thereof.

In embodiments, the curable composition optionally comprises at least one component selected from the group consisting of photo-initiators, mono- or multi-functional monomers, wetting agents, adhesion promoters, fillers, other rheology modifiers, thixotropic agents, plasticizers, UV-absorbers, UV-stabilizing agents, dispersants, antioxidants, antistatic agents, lubricants, opacifying agents, anti-foam agents and combinations thereof in a range of greater than zero and less than or equal to 30% by weight. In embodiments, the curable composition comprises the photo-initiator, which may be selected from the group consisting of α-hydroxyketones, phenylglyoxylates, benzyldimethylketals, α-aminoketones, mono-acyl phosphines, bis-acyl phosphines, phosphine oxides and metallocenes and combinations thereof. In embodiments, the photo-initiator is 1-hydroxy-cyclohexyl-phenyl-ketone.

In embodiments, a method of enhancing impact resistance of an article may comprise adding the curable composition to a 3D printing material to form a 3D printing material precursor; 3D printing with the 3D printing material precursor to form a 3D printed material; and curing the 3D printed material. In embodiments, the 3D printing material precursor and the 3D printed material are homogeneous. In embodiments, a 3D printed article may be formed from the curable composition. In embodiments, a 3D printing material precursor composition comprises the curable composition, added as an additive, which may function as an impact resistance-enhancing additive. In embodiments, the curable composition is added to a 3D printing material precursor in a weight ratio of from about 1 to about 90% by weight with respect to the total weight of the precursor composition or more preferably from about 5 to about 80% by weight with respect to the total weight of the precursor composition. In embodiments, a 3D printed article comprising (in particular in the 3D printing material precursor composition) the curable composition may have enhanced impact resistance with respect to an article resulting from a 3D printing material precursor composition that does not comprise the curable composition. In fact, the enhanced impact resistance or improved impact resistance (and potentially improved shear adhesion and cohesive strength) is measured with as reference article a printed article without addition of said curable composition of the present invention.

In embodiments, a cured composition may be obtained by curing the curable compositions described herein. In embodiments, a cured composition may be obtained by curing the curable compositions described herein, wherein the cured composition may be a 3D printed article from a resin or ink. In embodiments, use of a cured composition may be obtained by curing the curable compositions described herein in 3D printing applications. In embodiments, a 3D printed article may be formed from the curable compositions described herein. In embodiments, a cured product may be made from the curable compositions described herein. In embodiments, the curable compositions described herein may be used in 3D printing applications.

In embodiments, a 3D printed article comprising the curable compositions described herein have enhanced impact resistance with respect to an article resulting from a 3D printing material that does not comprise the curable composition. In embodiments, the curable compositions described herein may form a 3D printed article, a 3D printed coating or a 3D printed adhesive; and may be formed by a 3D impression process or by a stereolithographic process.

DETAILED DESCRIPTION OF THE INVENTION

Figure 1:
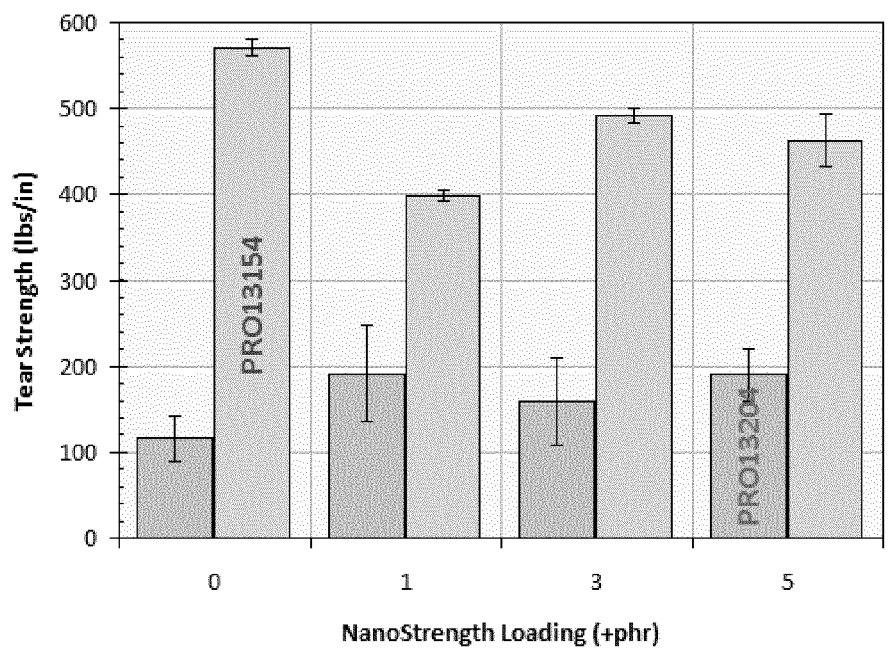
FIG. 1 shows a plot of tear strength (in lbs./inch) vs. additive loading for two multi-functional acrylate blends with varying amounts of Arkema's Nanostrength® added thereto.

The PIPS compositions may be additives for enhancement of impact resistance and rheological properties in 3D printing. The term "3D printing" as used herein encompasses: a) stereolithograpy; b) 3D printing; c) UV-curing 3D printing (such as jetting); and d) UV-curing additive manufacturing. Similarly, the term "3D printed" as used herein encompasses any article or product printed by: a) stereolithograpy; b) 3D printing; c) UV-curing 3D printing (such as jetting); and d) UV-curing additive manufacturing.

Self-assembly of a block copolymer into hard and soft domains upon curing can be achieved at the UV curable timescale. Block copolymers within a specific family of resins may thus phase separate under a UV curable timescale and offer improved toughness, such as impact resistance. Hard domains result from block A segments which are hard and preferably have a Tg higher than 60° C., more preferably higher than 70° C. while soft segments result from B block segments which are soft and preferably have a Tg lower than 0° C., more preferably lower than −10° C. Tg values where mentioned in the present invention correspond to Tg values as measured by Dynamic Mechanical Analysis and correspond to the temperature of tan delta peak at a frequency of 1 Hz (method ASTM 5026). More particularly, A blocks may be based on homopolymers or copolymers of methyl methacrylate and block B on polybutyl acrylates or poly ethyl hexyl acrylates. The weight ratio of A/B in said block copolymer may vary from 10/90 to 90/10.

Segmentation and hard/soft domain formation may be controlled by specific engineering of resin cure speed and resin solubility. Resins that are UV-curable tend to polymerize in about 1 second or less. In order for a phase separation to occur at such timescales, a portion of the block copolymer additive should become insoluble during polymerization of the surrounding matrix. To be useful, the block copolymer should be soluble enough prior to UV radiation exposure such that a homogenous mixture exists. Once polymerization starts, the block copolymer additive becomes sufficiently insoluble and segments into discrete and nanostructured hard or soft domains.

The inventors have discovered that a polymerization-induced phase-separating (PIPS) composition for toughening and impact resistance may be defined as monomer (e.g., component X) and block copolymer comprising at least one A block (of component Y) and at least one B block (of component Y), along with a cross-linker (e.g., component Z). Alternatively, the composition comprises components X, Y and Z, wherein X comprises a mono functional acrylic based compound; Y comprises a copolymer of at least one block A and at least one block B; and Z comprises a multifunctional cross-linker.

Favorable phase separation or nanostructuring may be induced through targeting specific compound affinity (e.g., component X) to desired blocks of ABA or AB type block copolymers (e.g., component Y). Thus, a slow cross-linker may be chosen for component Z such that desired phase separation (e.g., nano-structuring) may occur before polymerization or before gellation or before vitrification or before a gel-point is realized. The rate of reaction that the Z component undergoes is, or may be, less than the rate of reaction that the X component undergoes. Liming the gel-point (or the polymerization or the gellation or the vitrification) to allow diffusion of discrete domains into thermodynamically favorable phases (e.g., nano-structuring) is important and the cross-linker may have slower reactivity than those of component X. Upon curing, two domains may exist, whereby one domain is rich in, or predominantly, the B block of the Y component and the other domain is rich in, or predominantly, the A block of component Y, the X component and the Z component.

Thus, the composition, which is curable, comprises at least one multifunctional cross-linker (e.g., component Z) having slower reactivity than component X, the at least one multifunctional cross-linker being selected from the group consisting of oligomers and monomers, whereby the at least one multifunctional cross-linker has at least two (2) and up to six (6) functional groups, such as 2, 3, 4, 5 or 6 functional groups. Regarding oligomers as cross-linkers, the oligomers may be selected from the group consisting of oligomers with methacrylate, acrylate, vinyl, allylic, epoxy, oxetane, hydroxyl or ring opening functionality or those with polyester-, polyether- or urethane-based backbones. Such oligomers may have a molecular weight (Mw) in a range of 1,000-50,000 daltons or preferably in a range of 1,000-5,000 daltons or more preferably in a range of 1,000-2,000 daltons. Regarding monomers as cross-linkers, the monomers may be selected from the group consisting of methacrylate, acrylate, vinyl, allylic, epoxy, oxetane, hydroxyl, or ring opening functionality or those with polyester-, polyether- or urethane-based moieties. Such monomers may have a molecular weight (Mw) in a range of 150-2,500 daltons or preferably in a range of 150-1,000 daltons or more preferably in a range of 150-500 daltons.

If cross-linkers with too much reactivity are used (such as acrylates), the gel point or the like may be reduced and the block copolymers may not phase separate in a desirable manner such that no enhancements to performance or properties are observed and in some cases, a reduction in performance or properties is observed. FIG. 1 shows two multi-functional acrylate blends (e.g., denoted as Arkema's PRO13154® and PRO13204®) with varying amounts of Arkema's Nanostrength® (block copolymer with block A based on a PMMA copolymer and block B on PBA) added thereto. These compositions are outside the present invention by the absence of components X and Z. As can been seen, increasing the loading of Nanostrength® does not necessarily scale proportionally to the blend's tear strength. Without wishing to be bound by any particular theory, it is believed that this may be attributed to the fast curing time of the acrylates such that desirable phase separation is precluded from occurring.

The block affinity may be defined by equation (I), whereby block affinity is determining by taking the square root of the squares of the dispersive, polar and hydrogen bonding contributions to Hansen solubility.

$$[\text{block affinity}] = [\Delta d_{disperive}^2 + \Delta d_{polar}^2 + \Delta d_{hydrogen}^2]^{1/2} \quad (I)$$

Each of the d factors (e.g., $d_{dispersive}$, $d_{polar}$, $d_{hydrogen}$) may be calculated through the group contribution theory outlined by Hoy in 1989 (Hoy, K. L. "Solubility Parameters as a Design Parameter for Water Borne Polymers and Coatings", *J. Coated Fabrics* v.19, July 1989, pp. 53-67), hereby incorporated by reference in its entirety. Page 60 of Hoy provides a table with an outlining of pertinent functional groups and their structural contribution.

Desirable phase separation or segmentation is observed when differences in block affinities for component X to the A and B blocks of component Y are observed to satisfy equation (II).

$$([X \text{ to A Affinity}]\text{-}[X \text{ to B Affinity}])^2 0.5 \ (\text{cal/cm}^3)$$
$$\text{or} > 1 \ (J/\text{cm}^3)^{1/2} \text{ or}$$

$$[X \text{ to A Affinity}]\text{-}[X \text{ to B Affinity}] > 0.7 \ (\text{cal/cm}^3)^{1/2}$$
$$\text{or} > 1.4 \ (\text{cal/cm}^3) \text{ or} > 1 \ (J/\text{cm}^3)^{1/2} \quad (II)$$

Desirable toughening phase separation or segmentation is observed when differences in block affinities for component X to the A and B blocks of component Y are observed to satisfy equation (III).

$$([X \text{ to A Affinity}]\text{-}[X \text{ to B Affinity}])^2 1.0 \ (\text{cal/cm}^3) \text{ or}$$
$$> 2.0 \ (J/\text{cm}^3)^{1/2} \text{ or}$$

$$[X \text{ to A Affinity}]\text{-}[X \text{ to B Affinity}] > 1.0 \ (\text{cal/cm}^3)^{1/2}$$
$$\text{or} > 2.0 \ (J/\text{cm}^3)^{1/2} \quad (III)$$

Arkema's Nanostrength® technology is based on acrylic copolymers which organize on a nano structured scale when added to a polymer matrix or a resin. The Nano strength® imparts properties to the matrix or resin such as enhanced impact resistance together with a degree of elasticity. Nanostrength® technology may thus be desirable for 3D printing applications.

Solubility of each block of the Nanostrength® may be dependent on secondary interactions between molecules. Solubility may be predicted with Hansen solubility parameters, which are treated as coordinates in a three dimensional space. The closer two molecules are in this three-dimensional space, the more likely they are to dissolve into each other.

To predict which additives may be useful for 3D applications, the number and types of atoms may be determined. For example, trimethyllpropane triacrylate (TMPTA), depicted structurally below, may be used as a functional monomer additive (e.g., component X) to add to a resin.

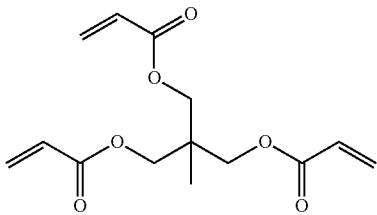 [SMILES: C=CC(=O)OCC(C)(COC(=O)C=C)COC(=O)C=C]

Figure 8:
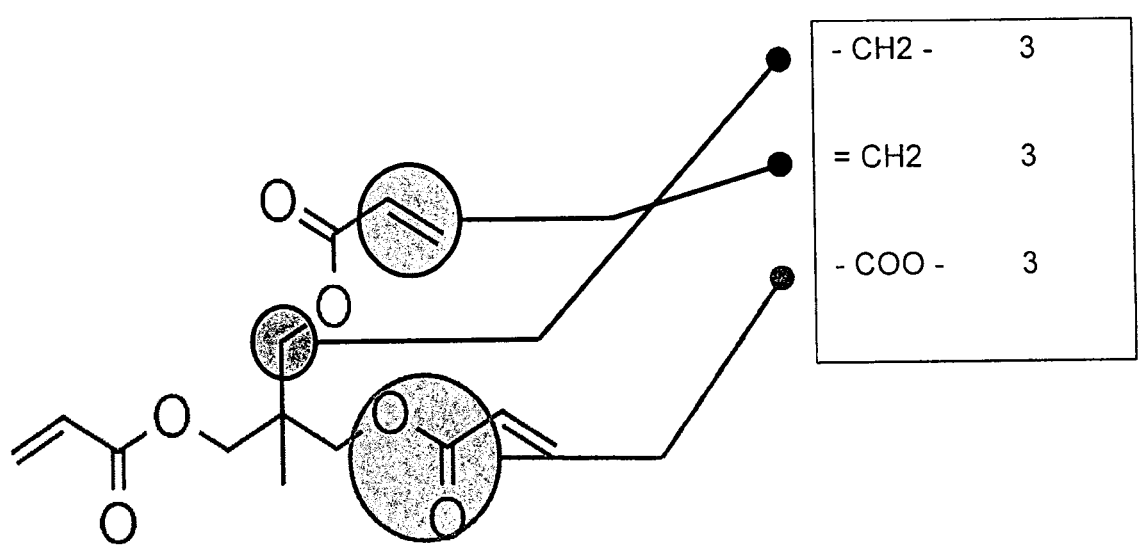
FIG. 8 shows the number and types of atoms determined for trimethylolpropane triacrylate (TMPTA).

The number and types of atoms determined for TMPTA are shown in FIG. 8.

The numbers and types of atoms for the polymers of the block copolymer should also be determined. For example, an ABA type of copolymer may be used that comprises poly(methyl methacrylate) (PMMA) as an A block and poly(butyl acrylate) (PBA) as a B block.

After the number and types of atoms are determined, Hansen solubility parameters may be determined for dispersive, polar and hydrogen bonding contributions to Hansen solubility. After determination of Hansen solubility parameters, these parameters are plotted in three dimensions and monomers that are spaced farthest from the one block while being close to the other may be considered an appropriate candidate for functional monomer ABC additives (e.g., component X) and selected as such.

Monomers that may be useful for shifting PMMA solubility include, without limitation, dimethyl acrylamide (DMA), diethyl acrylamide, dipropyl acrylamide or N-isopropyl acrylamide. Alteration of the PMMA block may comprise modification with any acrylic monomer such that the PMMA block is made more soluble, more reactive or harder (e.g., higher $T_g$).

Building blocks of the copolymer resins may include, without limitation, alkane acrylates such as propyl-, butyl-, penta-, hexa-, ocyl- and decyl-acrylate. Such building blocks may be best suited as a soft domain or phase.

Methods of making impact resistant articles described herein are not particularly limited and may comprise adding an impact modifier to a block copolymer and mixing the impact modifier and block copolymer. For instance, a PMMA with 25% Dimethylacrylamide (DMA) in the PMMA block is dispersed into a resin formulation that may favor the PMMA block over the PBA block. The resin may be heated to 120° C. for some time under high shear to disperse/dissolve the block copolymers and be allowed to cool to a homogenous liquid. The resin may then be added into a printer vat and undergo polymerization as a 3D printed part.

Various non-limiting aspects of the present invention may be summarized as follows:

1. A curable composition comprising component X and a resin of Y and Z, wherein the X component comprises an acrylic based additive; the Y component comprises a copolymer of at least one block A and at least one block B; and the Z component comprises a methacrylate cross-linker;

wherein the curable composition is a homogeneous liquid at ambient temperature prior to curing and wherein the curable composition is nano-structured after curing;

wherein the Z component is different than (from) the X component;

in particular with said curable composition comprising:
50-90% by weight of the X component,
1-30% by weight of the Y component,
5-60% by weight of the Z component, with X+Y+Z=100% and optionally, at least one component selected from the group consisting of photo-initiators, mono- or multi-functional monomers, wetting agents, adhesion promoters, fillers, other rheology modifiers, thixotropic agents, plasticizers, UV-absorbers, UV-stabilizing agents, dispersants, antioxidants, antistatic agents, lubricants, opacifying agents, anti-foam agents and combinations thereof in a range of greater than zero and less than or equal to 30% by weight.

2. The curable composition of Aspect 1, wherein the Z component is less reactive than the X component.

3. The curable composition of Aspect 1 or 2, wherein a difference in block affinity from X to A and from X to B is >0.7 $(cal/cm^3)^{1/2}$ or >1.4 $(J/cm^3)^{1/2}$, preferably >1.0 $(cal/cm^3)^{1/2}$ or >2.0 $(J/cm^3)^{1/2}$.

4. The curable composition of Aspects 1-3, wherein the X component has a molecular weight less than the Y and Z components.

5. The curable composition of Aspects 1-4, wherein the Z component is selected from the group consisting of oligomers or monomers with methacrylate, acrylate, vinyl, allylic, epoxy, oxetane, hydroxyl or ring opening functionality preferably with methacrylate, vinyl, allylic, epoxy, oxetane, hydroxyl and ring opening functionality; and wherein the Z component has at least two and up to six functional groups.

6. The curable composition of Aspects 1-5, wherein the Z component is selected from oligomers and comprises a polyester-, polyether- or poly urethane-based backbone.

7. The curable composition of Aspects 1-6, wherein the Z component is selected from oligomers having a molecular weight in a range of about 1,000-50,000 daltons or is selected from monomers having a molecular weight in a range of about 150-2,500 daltons, preferably in a range of 150-1,000 daltons or more preferably in a range of 150-500 daltons.

8. The curable composition of Aspects 1-7, wherein the curable composition further comprises a photo-initiator selected from the group consisting of a-hydroxyketones, phenylglyoxylates, benzyldimethylketals, a-aminoketones, mono-acyl phosphines, bis-acyl phosphines, phosphine oxides and metallocenes and combinations thereof.

9. The curable composition of Aspects 1-8, wherein the at least one A block and at least one B block of the Y component are different and selected from the group consisting of functionalized or unfunctionalized PMMA, PBA, PDMA or are selected from the group consisting of functionalized or unfunctionalized polymers of ethylhexyl acrylates, silicon acrylates, alkane acrylates, PEG-based monoacrylates, acrylic oligomer acrylates, isobornyl acrylates, cyclohexyl acrylates, nonyl-vinyl pyrrolidones, cyclic triformyl acrylates, acrylamides, ethoxy(ethoxy ethyl) acrylates and hydroxyethyl acrylates/methacrylates.

10. The curable composition of Aspects 1-9, wherein the at least one A block of component Y is selected from the group consisting of functionalized or unfunctionalized polyacrylates and polymethacrylates with molecular weights in the range of about 1,000-50,000 daltons.

11. The curable composition of Aspects 1-10, wherein the at least one B block of component Y is selected from the group consisting of functionalized or unfunctionalized polyacrylates with molecular weights in the range of about 2,500-60,000 daltons.

12. The curable composition of Aspects 1-12, wherein components X, Y and Z equal 100 wt % of the composition.

13. A method of enhancing impact resistance of an article, comprising adding the curable composition of Aspects 1-12 to a 3D printing material to form a 3D printing material precursor composition.

14. The method of Aspect 13, comprising 3D printing with the 3D printing material precursor to form a 3D printed material.

15. The method of Aspect 14, comprising curing the 3D printed material.

16. The method of Aspect 13, wherein the 3D printing material precursor and the 3D printed material are homogeneous.

17. Cured composition, wherein it is obtained by curing the curable composition according to any one of Aspects 1-12.

18. Cured composition obtained by curing the curable composition according to any one of Aspects 1-12, wherein it is a 3D printed article in the form of a 3D resin, a 3D ink, a 3D coating or a 3D adhesive.

19. A 3D printed article formed from the curable composition of any one of Aspects 1-12 or from a 3D printing material precursor composition comprising said curable composition as an additive.

20. A cured product made from the curable composition of any one of Aspects 1-12.

21. A 3D printed article formed from the curable composition of any one of Aspects 1-12 or from a 3D printing material precursor composition comprising said curable composition as an additive.

22. Use of the curable composition of any one of Aspects 1-12 in 3D printing applications.

23. Use of a cured composition obtained by curing the curable composition according to any one of Aspects 1-12 in 3D printing applications.

24. Use of a cured composition obtained by curing the curable composition according to any one of Aspects 1-12 as an impact resistance-enhancing additive.

25. The use of Aspect 22, wherein the curable composition is added to a 3D printing material precursor composition in a weight ratio of from about 1 to about 80% by weight with respect to a total weight of the precursor composition.

26. A 3D printed article resulting from curing the 3D printing material precursor composition of Aspect 25.

27. The 3D printed article of Aspect 26, having enhanced impact resistance with respect to an article resulting from a 3D printing material precursor that does not comprise the curable composition.

28. The use of Aspect 22, wherein the 3D printing applications comprise a 3D impression process or by a stereolithographic process.

29. The curable composition of Aspects 1-12, wherein the at least one A block and the at least one B block of the Y component are incompatible with each other.

30. The curable composition of Aspect 24, wherein the curing comprises radiation curing.

31. The curable composition of Aspects 1-12, wherein the X component comprises a mono functional monomer.

32. The curable composition of Aspects 1-12, wherein the X component is selected from the group consisting of ethylhexyl acrylates, silicon-containing acrylates, alkane acrylates, PEG-based mono-acrylates, isobornyl acrylates, cyclohexyl acrylates, nonyl-vinyl pyrrolidones, cyclic triformyl acrylates, acrylamides, ethoxy(ethoxy ethyl) acrylates, hydroxyethyl acrylates/methacrylates, tricyclodecane monoacrylates, tetrahydrofurfuryl acrylates, adamantyl acrylates, acryloyl morpholines and ethoxylated equivalents thereof.

The term "the blocks A and B of the block copolymer AB (or ABA) are incompatible with each other", means that when the block copolymer is heated to the molten state and let to be cooled, then, after cooling there is a phase separation between segments of blocks A and B in two different phases (domains) as can be seen by AFM microscopy (see experimental part and FIGS. 4-7).

EXAMPLES

In the Examples below, PRO13279® is an acrylic block copolymer of poly(methyl methacrylate) (PMMA) and Polybutyl acrylate (PBA); SR833S® is a di-functional acrylate monomer; SR531® is a methacrylate monomer; M52N® is an acrylic block copolymer of PMMA/dimethylaniline and of Polybutyl acrylate (PBA); CN1964® is methacrylate oligomer; and SR506® is monofunctional acrylate monomer.

Example 1

TABLE 1

| Hansen solubility data for a typical monomer | | | |
|---|---|---|---|
| | Dispersion Factor | Polarity Factor | H-Bonding Factor |
| TMPTA | 7 | 5 | 4 |
| PMMA | 6 | 4 | 4 |
| PBA | 8 | 4 | 3 |

Figure 2:
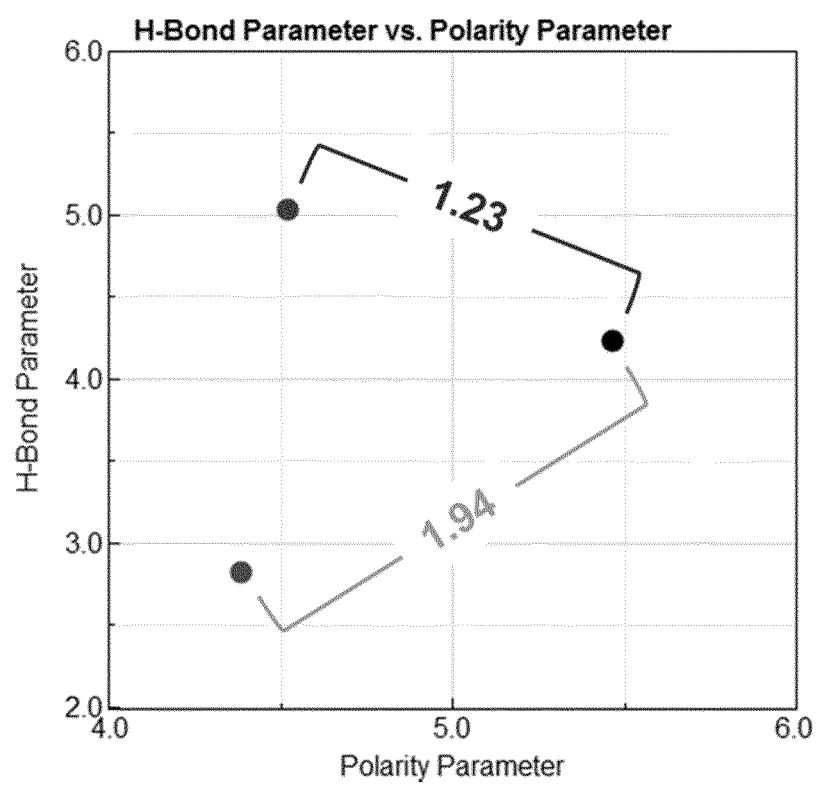
FIG. 2 shows a plot of the hydrogen bonding parameter vs. the polarity parameter for a composition comprising PMMA, PBA and TMPTA.

Table 1 shows Hansen solubility parameter data for a standard monomer TMPTA as additive (e.g., component X) and a PMMA-PBA-PMMA block copolymer (e.g., A and B blocks of component Y). The values shown in Table 1 are representative and have been rounded to the nearest whole integer. FIG. 2 shows a plot of the hydrogen bonding parameter vs. the polarity parameter. In FIG. 2, the uppermost data point represents that PMMA data, the lowermost data point represents the PBA data and the middle data point represents the TMPTA data. As can be seen, a distance between the PMMA and the TMPTA is 1.23 arbitrary units and the distance between the PBA and the TMPTA is 1.94 arbitrary units. It may be concluded that TMPTA prefers to reside closer to PMMA than to PBA.

Example 2

Figure 3:
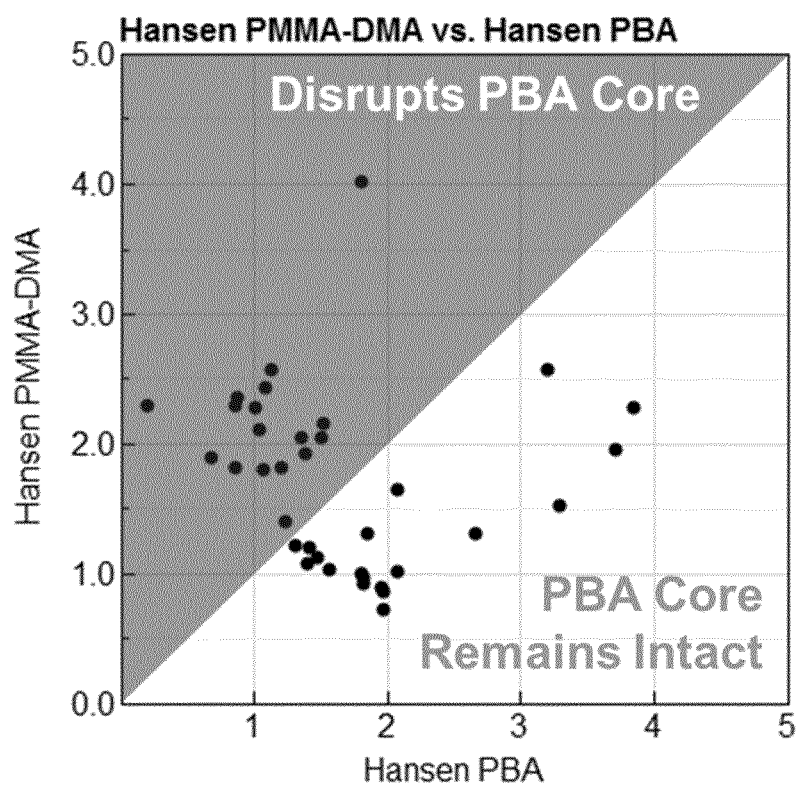
FIG. 3 shows a plot of Hansen solubility parameters for a block of PMMA-DMA vs. a block of PBA.

FIG. 3 shows how solubility may be exploited to target compositions that would have the appropriate phase separating properties, whereby materials may be selected based on location or distance from an origin.

FIG. 3 plots the Hansen solubility parameters for a block of PMMA-dimethylacrylamide (DMA) and a block of PBA. In FIG. 3, the data points that fall within the shaded area of the graph have been determined to lead to a disruption in the PBA core, whereas data points that fall within the un-shaded area of the graph have been determined to lead to an intact PBA core.

Example 3 and Comparative Example 1

Table 2 shows mechanical property data for Example 3 and Comparative Example 1. Both examples comprise a block copolymer comprising PRO13279® and SR833S®. However, the difference is reflected in the fact that Comparative Example 1 does not comprise any impact modifier and Example 3 comprises Nanostrength® M51 impact modifier.

TABLE 2

Mechanical Properties of Block Copolymers With and Without Additives

| | | Comparative Example 1 | Example 3 |
|---|---|---|---|
| Koenig | | 105 s | 141 s |
| Instron | Modulus Kgf/cm² (MPa) | 2640 (258.9) | 3407 (334.1) |
| | Elongation | 21.8% | 9.2% |
| | Stress @ Break Kgf/cm² (MPa) | 179 (17.6) | 305 (29.9) |

As can be seen, the inclusion of Nanostrength® M51 impact modifier in Example 3 leads to a nearly 800 kfg/cm² (78.5 MPa) increase in modulus, an over a 12% reduction in elongation and an over 125 kgf/cm² (12.3 MPa) increase in the stress at breaking.

Comparative Example 2

Figure 4:
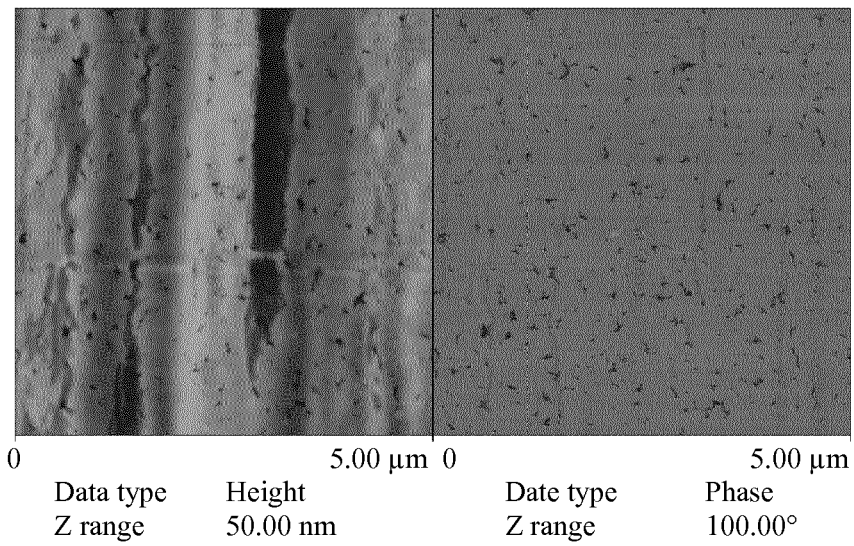
FIG. 4 shows Atomic Force Microscopy (AFM) results of a control formulation that comprises components X and Z, but does not comprise component Y. AFM data is shown for properties related to height (left hand side of FIG. 4) and to modulus (right hand side of FIG. 4).

FIG. 4 shows Atomic Force Microscopy (AFM) results of a control formulation that does not include a block copolymer for properties related to height (left hand side of FIG. 4) and to modulus (right hand side of FIG. 4). In other words, Comparative Example 2 comprises the X and Z components, but does not comprise the Y component (e.g., does not comprise a copolymer of block A and block B). In Comparative Example 2, the X component is Arkema's SR531® monomer and the Z component is Arkema's CN1964®. To acquire the image by AFM, the probe scans over an area of the sample, measuring the local properties by tapping on the surface. As can be seen from FIG. 4, particularly the image related to height (left hand side of FIG. 4), there is no significant phase separation between the components of the system, as shown by the largely yellow area.

Example 4

Figure 5:
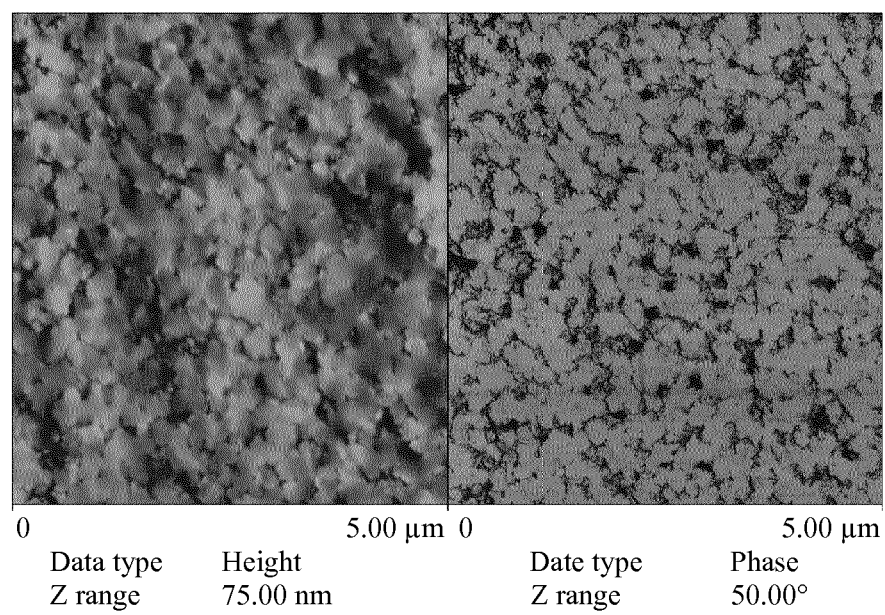
FIG. 5 shows Atomic Force Microscopy (AFM) results for a composition in accordance with the disclosure and satisfying equation (II) below. AFM data is shown for properties related to height (left hand side of FIG. 5) and to modulus (right hand side of FIG. 5).

FIG. 5 shows Atomic Force Microscopy (AFM) results for properties related to height (left hand side of FIG. 5) and to modulus (right hand side of FIG. 5) of a formulation according to the disclosure. In Example 4, the X component is Arkema's SR531® monomer, the Y component is Arkema's Nanostrength® M52N® impact modifier and the Z component is Arkema's CN1964®. The composition of Example 4 satisfies equation (II) above according to the present invention. As can be seen, the discrete and dark notch globules are the expected soft phase separation (e.g., soft elastic domains).

Example 5

Figure 6:
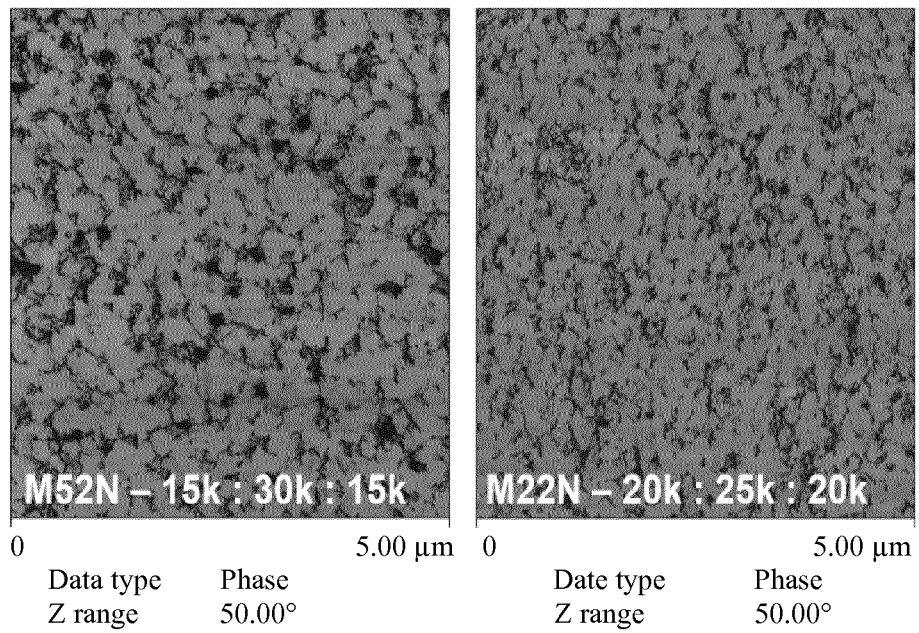
FIG. 6 shows Atomic Force Microscopy (AFM) results for compositions in accordance with the disclosure and satisfying equation (II) below. AFM data is shown for properties related to modulus (left and right hand sides of FIG. 6).

FIG. 6 shows Atomic Force Microscopy (AFM) results for properties related to modulus (both left and right hand sides of FIG. 6) of another formulation according to the disclosure. In FIG. 6, the left hand side of the AFM results were obtained with a composition wherein the X component is Arkema's SR531® monomer, the Y component is Arkema's Nanostrength® M52N® impact modifier and the Z component is Arkema's CN1964®. In FIG. 6, the right hand side of the AFM results were obtained with a composition wherein the X component is Arkema's SR531® monomer, the Y component is Arkema's Nanostrength® M52N® impact modifier and the Z component is Arkema's CN1964®. The composition of Example 5 satisfies equation (II) above. As can be seen, the discrete and dark notch globules are the expected soft phase separation (e.g., soft elastic domains). Moreover, FIG. 6 demonstrates that the domain size is driven by the block copolymer's individual block size, with the largest domains shown for the larger middle PBA block design. In other words, changing the size of block A and/or block B of component Y can lead to a tailoring or customization of domain size.

Example 6

Figure 7:
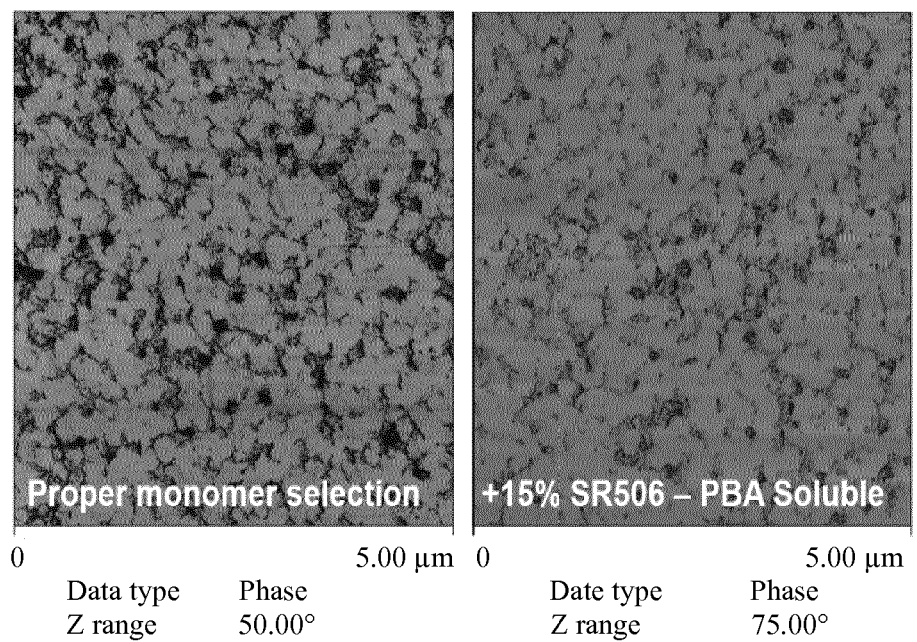
FIG. 7 shows Atomic Force Microscopy (AFM) results for compositions in accordance with the disclosure and satisfying equation (II) below. AFM data is shown for properties related to modulus (left and right hand sides of FIG. 7).

FIG. 7 shows Atomic Force Microscopy (AFM) results for properties related to modulus (both left and right hand sides of FIG. 7) of another formulation according to the disclosure. In FIG. 7, the left hand side of the AFM results were obtained with a composition wherein the X component is Arkema's SR531® monomer, the Y component is Arkema's Nanostrength® M52N® impact modifier and the Z component is Arkema's CN1964®. In FIG. 7, the right hand side of the AFM results were obtained with a composition similar to that of the left hand side, except that the X component includes not only Arkema's SR531® monomer, but also Arkema's SR506® monomer. The composition used to obtain the results of the left hand side of FIG. 7 satisfies equation (II) above, but the composition used to obtain the results of the right hand side of FIG. 7 does not satisfy equation (II) above.

As can be seen, the discrete and dark notch globules are the expected soft phase separation (e.g., soft elastic domains) for the left hand side of FIG. 7, however, the phase separation shown in the right hand side of FIG. 7 reflects poor phase separation or miscibility between the blocks.

When the word "about" is used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages.

The molecular weights referred to in this specification are weight-average molecular weights (Mw) and determined by gel permeation chromatography (GPC) in THF with Polystyrene standards.

It will now be apparent that a new, improved and non-obvious PIPS compositions systems has been described in this specification with sufficient particularity as to be understood by one of ordinary skill in the art. Moreover, it will be apparent to those skilled in the art that modifications, variations, substitutions and equivalents exist for features of the PIPS compositions which do not materially depart from the spirit and scope of the embodiments disclosed herein. Accordingly, it is expressly intended that all such modifications, variations, substitutions and equivalents which fall within the spirit and scope of the invention as defined by the appended claims shall be embraced by the appended claims.

The invention claimed is:

1. A curable composition comprising components X, Y and Z, wherein the X component comprises an acrylic based monomer; the Y component comprises a block copolymer of at least one block A and at least one block B; and the Z component comprises a multifunctional cross-linker;

wherein the curable composition is a homogeneous liquid at ambient temperature prior to curing and wherein the curable composition is nano-structured after curing; and wherein the Z component is different than the X component and the Z component is less reactive than the X component.

2. The curable composition of claim 1, wherein a difference in block affinity from X to A and from X to B is >0.7 $(cal/cm^3)^{1/2}$ or >1.4 $(J/cm^3)^{1/2}$.

3. The curable composition of claim 1, comprising from 50 to 90% by weight of the X component, from 1 to 30% by weight of the Y component and from 5 to 60% by weight of the Z component with X+Y+Z=100%.

4. The curable composition of claim 1, wherein the X component has a molecular weight less than the molecular weight of Y and Z components.

5. The curable composition of claim 1, wherein the curable composition further comprises at least one component selected from the group consisting of photo-initiators, mono- or multi-functional monomers, wetting agents, adhesion promoters, fillers, other rheology modifiers, thixotropic agents, plasticizers, UV-absorbers, UV-stabilizing agents, dispersants, antioxidants, antistatic agents, lubricants, opacifying agents, anti-foam agents and combinations thereof in a range of greater than zero and less than or equal to 30% by weight with respect to the total weight or vs weight of X+Y+Z.

6. The curable composition of claim 1, wherein the Z component is selected from the group consisting of oligomers or monomers with methacrylate, acrylate, vinyl, allylic, epoxy, oxetane, hydroxyl and ring opening functionality; and wherein the Z component has at least two and up to six functional groups with respect to said functionality.

7. The curable composition of claim 1, wherein the Z component is selected from oligomers and comprises a polyester-, polyether- or polyurethane-based backbone.

8. The curable composition of claim 1, wherein the Z component is selected from oligomers and the oligomers have a molecular weight in a range of 1,000-50,000 daltons or is selected from monomers having a molecular weight in a range of 150-2,500 daltons.

9. The curable composition of claim 1, wherein the curable composition comprises a photo-initiator selected from the group consisting of α-hydroxyketones, phenylglyoxylates, benzyldimethylketals, a-aminoketones, mono-acyl phosphines, bis-acyl phosphines, phosphine oxides and metallocenes and combinations thereof.

10. The curable composition of claim 1, wherein the at least one A block and the at least one B block of the Y component are different and selected from the group consisting of functionalized or unfunctionalized polymethylmethacrylate (PMMA), Polybutylacrylate (PBA), polydimethylacrylamide (PDMA) or are selected from the group consisting of functionalized or unfunctionalized polymers of ethylhexyl acrylates, silicon-containing acrylates, alkyl acrylates, PEG-based mono-acrylates, acrylic oligomer acrylates, isobornyl acrylates, cyclohexyl acrylates, nonyl-vinyl pyrrolidones, cyclic triformyl acrylates, acrylamides, ethoxy(ethoxy ethyl) acrylates and hydroxyethyl acrylates/methacrylates.

11. The curable composition of claim 1, wherein the at least one A block of component Y is selected from the group consisting of functionalized or unfunctionalized polyacrylates and polymethacrylates with a molecular weight in the range of 1,000-50,000 daltons.

12. The curable composition of claim 1, wherein the at least one B block of component Y is selected from the group consisting of functionalized or unfunctionalized polyacrylates with molecular weights in the range of 2,500-60,000 daltons.

13. The curable composition of claim 2, wherein the difference in block affinity is >1.0 $(cal/cm^3)^{1/2}$ or >2.0 $(J/cm^3)^{1/2}$.

14. The curable composition of claim 1, wherein the at least one A block and the at least one B block of the Y component are incompatible with each other.

15. The curable composition of claim 1, wherein the said acrylic based monomer in the X component is a monofunctional monomer.

16. The curable composition of claim 1, wherein the X component is selected from the group consisting of ethylhexyl acrylates, silicon acrylates, alkane acrylates (other than ethyl hexyl acrylates alkane acrylates), PEG-based mono-acrylates, isobornyl acrylates, cyclohexyl acrylates, nonyl-vinyl pyrrolidones, cyclic triformyl acrylates, acrylamides, ethoxy(ethoxy ethyl) acrylates, hydroxyethyl acrylates/methacrylates, tricyclodecane monoacrylates, tetrahydrofurfuryl acrylates, adamantyl acrylates, acryloyl morpholines and ethoxylated equivalents thereof.

17. A 3D printing material precursor composition, wherein it comprises as an additive the curable composition of claim 1.

18. The 3D printing material precursor composition of claim 17, wherein the curable composition is added to the 3D printing material to form said precursor composition in a weight ratio of from about 1 to 80% by weight with respect to a total weight of said precursor composition.

19. A cured composition, wherein it results from the curing, in particular from radiation curing of the curable composition of claim 1.

20. The cured composition of claim 19, wherein the composition forms a 3D printed resin, a 3D printed ink, a 3D printed coating or a 3D printed adhesive.

21. The cured composition of claim 20, wherein the 3D printed resin, ink, coating or adhesive is formed by 3D impression process or by a stereolithographic process.

22. A method of enhancing impact resistance of an article, comprising adding the curable composition of claim 1 to a 3D printing material to form a 3D printing material precursor composition.

23. The method of claim 22, comprising 3D printing with curing of the 3D printing material precursor composition to form a 3D printed material or 3D printed article.

24. The method of claim 23, wherein the 3D printing material precursor composition and the 3D printed material are homogeneous.

25. A method for enhancing the impact resistance for 3D printed materials or 3D printed articles by a 3D impression process or by a stereolithographic process, which method comprises using the curable composition of claim 1, as an impact resistance additive in the 3D printing material precursor compositions.

26. A 3D printed article or material, wherein it results from the curable composition of claim 1.

27. The 3D printed article or material of claim 26, wherein it has enhanced impact resistance with respect to a 3D printed article without the curable composition.

\* \* \* \* \*